John W. Cochran. Imp'd Car &c Spring.

No. 119,823.

Patented Oct. 10, 1871.

Witnesses:

J. W. Cochran 119,823

UNITED STATES PATENT OFFICE.

JOHN W. COCHRAN, OF NEW YORK, N. Y.

IMPROVEMENT IN RAILWAY-CAR SPRINGS.

Specification forming part of Letters Patent No. 119,823, dated October 10, 1871.

*To all whom it may concern:*

Be it known that I, JOHN W. COCHRAN, of the city, county, and State of New York, have invented a new and useful Improvement in Springs for Railroad Cars and other purposes, of which the following is a full, clear, and exact description, reference being had to the accompanying drawing forming part of this specification, and in which—

Figure 1:
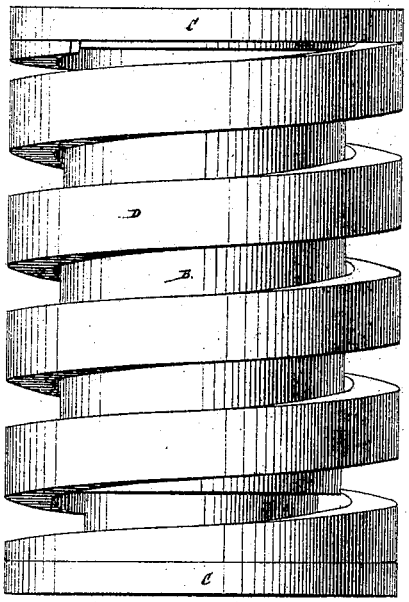
Figure 3:
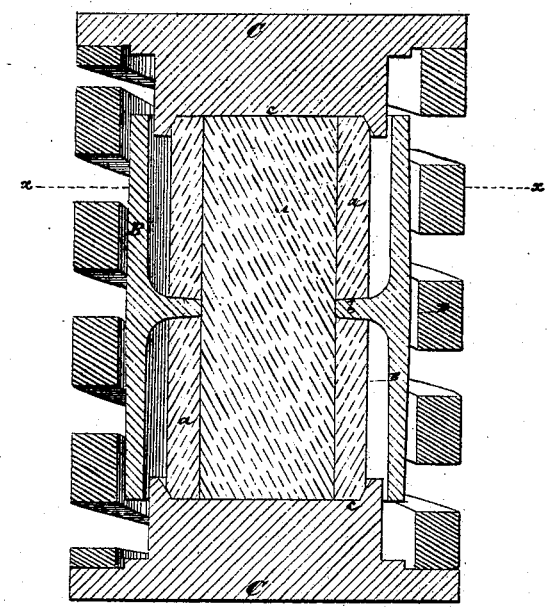
Figure 2:
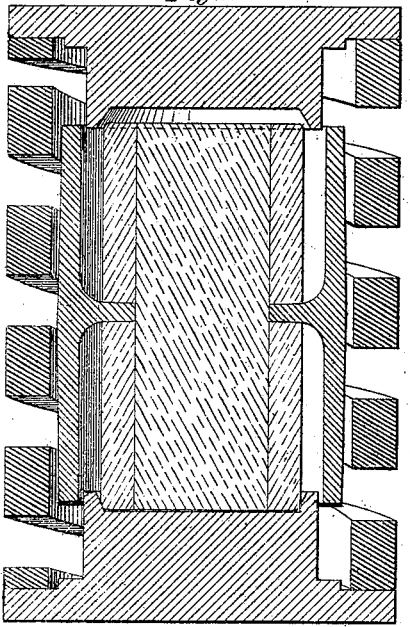
Figure 4:
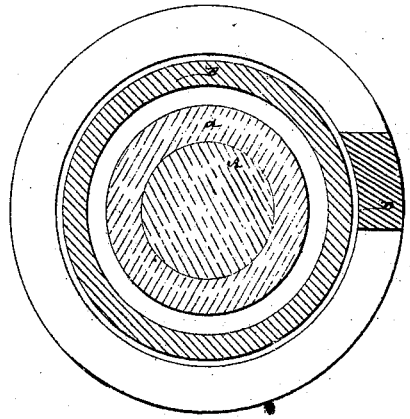

Figure 1 is an exterior longitudinal view of a spring constructed in accordance with my improvement. Fig. 2, a longitudinal section of the same, showing its condition before pressure is applied. Fig. 3, a similar section, showing it partly compressed; and Fig. 4, a transverse section thereof on the line $x\,x$ in Fig. 2.

Similar letters of reference indicate corresponding parts throughout the several figures.

This invention relates to that class of springs for railroad cars and other purposes in which cylinders or columns of India rubber are combined with helices of steel; and the invention consists in the novel construction of such a spring whereby, while the rubber and steel are co-active, they operate in a certain degree independently of each other, and the rubber is kept free from friction against metallic surfaces and the metallic spring is sustained against buckling. The elements of the combination are a central column of India rubber with collars or bands of the same material, a surrounding metallic cylinder or case connected with the rubber in a peculiar manner, whereby, while it is suspended from or supported by the rubber, it is also made to support the rubber; a helical metallic spring, arranged outside of said cylinder or case; and heads or followers, arranged independently of each other, and constructed to center or hold the rubber column at its ends, and fitting freely within the metallic case as a guide.

Referring to the accompanying drawing, A represents the rubber column, that may either be made solid or hollow, but preferably solid. It has fitted tightly over its exterior two collars or bands, *a a*, of the same material, said bands being each of a depth equal to nearly half the height of the column. B is the metallic cylinder or case, of the same length, or thereabout, as the rubber spring A, which it surrounds concentrically, the two being kept in a concentric position by means of an internal circumferential flange, *b*, provided within the cylinder midway or thereabout of its length, and fitting to the column. Said cylinder otherwise is free from any projection or protuberances on its interior, and its internal diameter is considerably larger than the external diameter of the rubber collars *a a* when the latter are in their normal condition. The flange *b* is of such thickness that when the collars or bands *a a* are in contact with it their outer ends are flush or nearly so with the ends of the column A. C C are the heads or followers, arranged independent of each other and constructed so as to freely enter the cylinder or case B at its ends, with cups or recesses *c c* on their inside faces, to receive within them the ends of the rubber column A and its collars *a a* and center the said column and collars, which may be considered together as one rubber spring. The said followers C C are made with outside flanges to form bearings for the ends of the spiral metallic spring D, which is arranged to surround in a free or loose manner the metallic case B. The relative lengths of the helix or spring D and rubber spring A *a a* and depths of the heads C C are such that in the normal condition of the parts or with a light load the whole pressure is taken by the spiral spring, the rubber spring then resting upon the lower head C with the upper head out of contact with it, as shown in Fig. 2, and the case B being suspended from between the collars *a a* by its flange *b*. As the load or pressure increases the upper head comes down upon the rubber spring and so compresses it longitudinally and produces its circumferential expansion until the pressure reaches a certain degree, when the rubber springs, the parts A *a a* of which are all compressed and expanded together as though they were one body, come in contact with the interior of the cylinder or case B and the spring comes home to a dead point. The above action takes place without any friction of the rubber in the cylinder or case, or any between the cylinder or case and the spiral spring, the absence of friction being consequent upon the movement of the cylinder or case B with the spring, as the rubber and the coil are contracted longitudinally.

An important and peculiar feature of the operation of the cylinder or case B is that it forms a guide to the steel spring to prevent it from buckling without there being any friction between it and the said spring. Even in case of actual contact between the two, consequent upon a slight buckling of the steel spring, their action is frictionless; for such contact would occur at the middle of the length of the two, at which point the two move up and down together at the same velocity.

What is here claimed, and desired to be secured by Letters Patent, is—

The cylinder B, constructed with an internal flange, b, about midway of its length, in combination with the rubber core A, sleeves a, spiral spring D, and caps C C, all arranged substantially as shown and described.

J. W. COCHRAN.

Witnesses:
FRED. HAYNES,
FERD TUSCH.